(12) United States Patent
Terry

(10) Patent No.: US 7,168,902 B2
(45) Date of Patent: Jan. 30, 2007

(54) WEDGE CAM LOCK WASHER FOR THREADED FASTENERS

(76) Inventor: Sydney L. Terry, 47 Pine Ct., Suite B, Grosse Pointe Farms, MI (US) 48236

( * ) Notice: Subject to any disclaimer, the term of this patent is extended or adjusted under 35 U.S.C. 154(b) by 47 days.

(21) Appl. No.: 10/682,715

(22) Filed: Oct. 9, 2003

(65) Prior Publication Data

US 2004/0131443 A1 Jul. 8, 2004

Related U.S. Application Data

(60) Provisional application No. 60/417,352, filed on Oct. 9, 2002.

(51) Int. Cl.
*F16B 39/24* (2006.01)

(52) U.S. Cl. ................ 411/160; 411/149; 411/535; 411/432

(58) Field of Classification Search ........... 411/149, 411/160, 161, 535, 536, 432, 916, 917
See application file for complete search history.

(56) References Cited

U.S. PATENT DOCUMENTS

| | | | | |
|---|---|---|---|---|
| 428,183 A | * | 5/1890 | Trimble et al. ........... 411/136 |
| 553,780 A | * | 1/1896 | Dickason .................. 411/136 |
| 618,436 A | * | 1/1899 | Parker ...................... 411/136 |
| 625,529 A | * | 5/1899 | Andrees ................... 411/136 |
| 2,228,005 A | * | 1/1941 | Giles ........................ 411/536 |
| 3,263,727 A | * | 8/1966 | Herpolsheimer ......... 411/136 |
| 3,329,190 A | * | 7/1967 | Oldenkott ................ 411/136 |
| 4,433,879 A | * | 2/1984 | Morris ..................... 384/626 |
| 4,538,313 A | * | 9/1985 | Frieberg ................... 470/42 |
| 4,708,555 A | * | 11/1987 | Terry ....................... 411/149 |
| 5,080,545 A | * | 1/1992 | McKinlay ................ 411/149 |
| 5,090,855 A | * | 2/1992 | Terry ....................... 411/144 |
| 5,203,656 A | * | 4/1993 | McKinlay ................ 411/149 |
| 5,409,338 A | * | 4/1995 | McKinlay ................ 411/149 |
| 5,474,409 A | * | 12/1995 | Terry ....................... 411/134 |
| 5,626,449 A | * | 5/1997 | McKinlay ................ 411/149 |
| 5,967,724 A | * | 10/1999 | Terry ....................... 411/149 |
| 6,347,915 B1 | * | 2/2002 | Balzano ................... 411/149 |
| 6,935,822 B2 | * | 8/2005 | Hartmann et al. ........ 411/161 |
| 2003/0077143 A1 | * | 4/2003 | Smolarek ................. 411/161 |

\* cited by examiner

*Primary Examiner*—William L. Miller
(74) *Attorney, Agent, or Firm*—Reising, Ethington, Barnes, Kisselle, P.C.

(57) ABSTRACT

A locking device for a threaded fastener comprises a pair of washers each having a plurality of wedge cam sets that include a base-cam and a raised tooth-cam. When the washers are mated together in use, the wedge cam sets of each washer are placed into confronting engagement with those of the other washer, with the raised tooth-cams of each washer engaging the base-cams of the other washer. The base-cam surfaces are ramped so that, as the tooth-cams slide along them during relative rotational movement, the combined axial height of the two washers changes—decreasing during tightening and increasing during loosening so that unintended partial loosening of the fastener is offset by expansion of the washers to thereby maintain bolt tension. Raised shoulders at each end of the tooth-cams are used to inhibit the amount of relative rotational movement of the two washers in both directions.

44 Claims, 4 Drawing Sheets

WEDGE CAM LOCK WASHER FOR THREADED FASTENERS

CROSS-REFERENCE TO RELATED APPLICATION

This application claims the priority of U.S. Provisional Application No. 60/417,352, filed Oct. 9, 2002.

FIELD OF THE INVENTION

This invention relates to threaded fasteners and more particularly, it relates to an anti-loosening mechanism for use with threaded fasteners.

BACKGROUND OF THE INVENTION

In the prior art, there are many anti-loosening devices for threaded fasteners which are adapted to cause jamming of the threads between the nut and bolt when the nut is turned in a loosening direction. For example, it is known to interpose a pair of wedge cams between the nut or bolt head and the workpiece which are operative to prevent unwanted loosening of the fastener.

Heretofore, the wedge cam anti-loosening device has had two major disadvantages. First, removal of the nut requires rotation of the wedge cams in unison with the nut in order to avoid further tightening of the threads; if the nut continues to be forcibly rotated in the loosening direction, the wedge cams have progressively decreasing area of contact with each other and the stresses become increasingly larger until the cams override each other causing the crest of the cams to be damaged. Second, when the nut is tightened the tightening torque is transmitted through the wedge cams which often causes unwanted embedment or sticking of the cam driving teeth to each other, thereby impairing freedom of relative movement of the cams which operates to inhibit loosening of the fastener threads under conditions of vibration and shock.

A general object of this invention is to provide an improved anti-loosening mechanism for threaded fasteners which overcomes the foregoing disadvantages of the prior art.

SUMMARY OF THE INVENTION

In accordance with one aspect of the invention, there is provided a locking device for a threaded fastener which comprises a pair of washers each having a plurality of wedge cam sets that include a base-cam and a raised tooth-cam. When the washers are mated together in use, the wedge cam sets of each washer are placed into confronting engagement with those of the other washer, with the raised tooth-cams of each washer engaging the base-cams of the other washer to allow relative rotational movement of the washers. The base-cam surfaces are ramped so that, as the tooth-cams slide along them during the relative rotational movement, the combined axial height of the two washers changes. The degree of inclination of the ramped surfaces is sufficient to inhibit loss of bolt tension and loosening of the threaded fastener under conditions of impact and vibration; thus, for example, when placed between a nut and workpiece, loosening of the nut by slight rotation in the loosening direction due to vibration or impact is accompanied by concomitant rotation of the washer in contact with the nut, with the ramped surfaces being inclined so that the combined axial height of the two washers increases by at least as much as the axial distance moved by the nut during the slight loosening. This actually increases bolt tension on the threads to thereby help lock the nut in place.

The rotational movement of one washer relative to the other is limited at each end of the angular travel by engagement of a shoulder of the tooth-cams from the one washer with a shoulder of the tooth-cams of the other washer. Thus, when the fastener is being tightened, the relative rotation between the washers in the tightening direction causes the tooth-cams to slide down the base-cam ramped surfaces until they engage a shoulder of one of the tooth-cams from the other washer. At this point the combined axial height of the washers is minimized and the washers stay in this orientation while the fastener is being fully tightened. During purposeful loosening of the fastener, such as by using a wrench, the movement in the loosening direction causes the tooth-cams to slide up the base-cam ramped surfaces which initially causes expansion of the combined axial height of the washers and thus further resistance to loosening. However, continued relative rotation of the washers in the loosening direction with sufficient force to overcome this resistance will cause the tooth-cams to continue sliding up the ramped surfaces until they engage another shoulder of one of the tooth-cams from the other washer, at which point no additional expansion of the height of the washers will take place and the fastener can then be fully loosened.

In accordance with another aspect of the invention, there is a provided a locking device comprising a pair of washers that can be assembled together to permit limited relative rotational movement of the washers in a manner that maintains a substantially constant surface area of contact between each other throughout the extent of the movement. For this purpose, the two washers can utilize the wedge cam set configuration summarized above.

In accordance with yet another aspect of the invention, the above-noted features can be incorporated into one or both of the threaded fastener components to thereby eliminate the need for one of the washers. Thus, the cam surfaces can be disposed on the inner face of a nut and the outer face of a washer, the inner face of a bolt head and the outer face of a washer or, as discussed above, on the confronting faces of two washers.

DESCRIPTION OF THE DRAWINGS

Preferred exemplary embodiments of the invention will hereinafter be described in conjunction with the appended drawings, wherein like designations denote like elements, and wherein.

BEST MODE FOR CARRYING OUT THE INVENTION

Figure 1A:
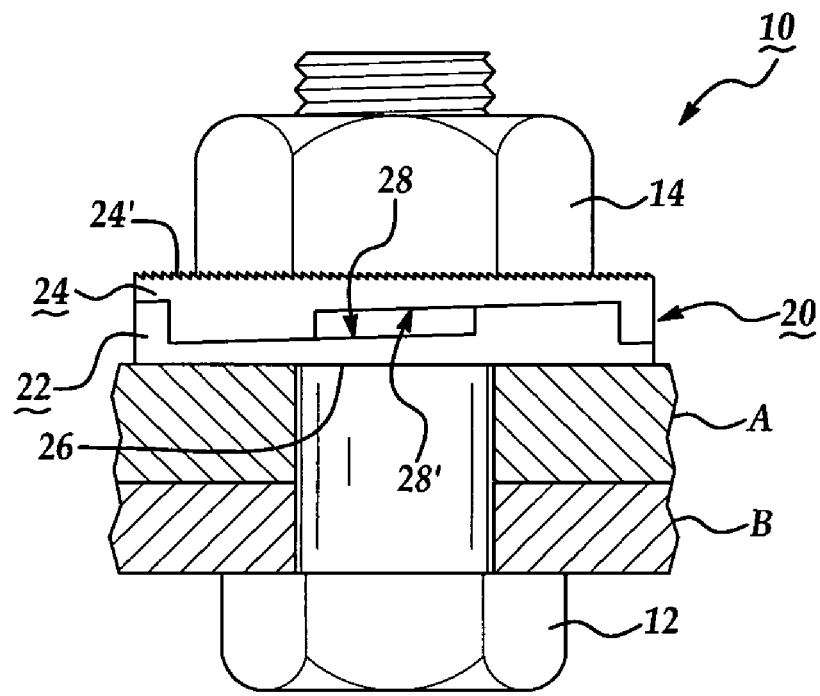
FIG. 1A is an elevation view, partially in section, of a fastener assembly which includes a pair of wedge cam washers depicted in a first relative rotative position which causes the washers to have the minimum stack-up thickness.

Referring now to the drawings, an illustrative embodiment of the invention is shown in an anti-loosening mechanism for use with threaded fasteners such as nuts and bolts and the like especially adapted for use in operating environments which subject the work pieces in the clamped joint to shock and vibration. The illustrative embodiment is implemented in parts made of steel; however, it will be understood that corresponding embodiments could also be implemented in parts made of other materials such as plastics or other metals. It will become apparent, as the description proceeds, that the invention is useful in many different applications and may be realized in a wide variety of embodiments.

Figure 1B:
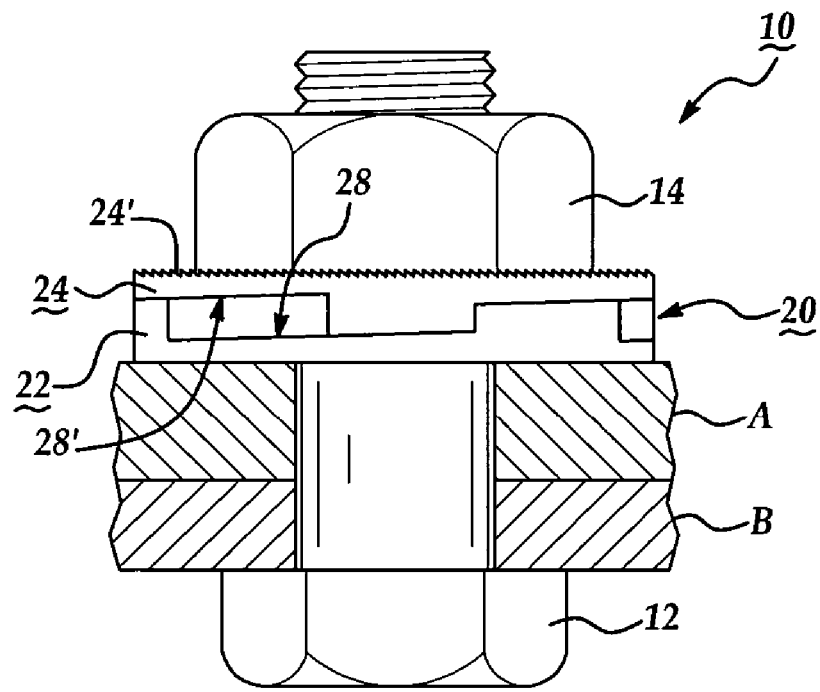
FIG. 1B is a view of the fastener assembly of FIG. 1A with the wedge cam washers depicted in a second relative rotative position which causes the washers to have the maximum stack-up thickness.

FIGS. 1A and 1B illustrate a clamped joint 10 in which two work pieces A and B are clamped together by a threaded fastener including a bolt 12 and nut 14, suitably of any conventional design. The clamped joint also includes an anti-loosening mechanism, or locking device, 20 comprising an inner wedge cam washer 22 and an outer wedge cam washer 24. The inner washer 22 comprises a wedge cam structure 28 on its outer surface and the outer washer 24 comprises a wedge cam structure 28' on its inner surface, as will be described in detail below. FIG. 1A shows the inner wedge cam washer 22 and the outer wedge cam washer 24 in a first rotative position relative to each other which causes the washers to have the minimum stack-up thickness; FIG. 1B shows them in a second rotative position relative to each other which causes the washers to have the maximum stack-up thickness, as will be explained below.

Figure 2:
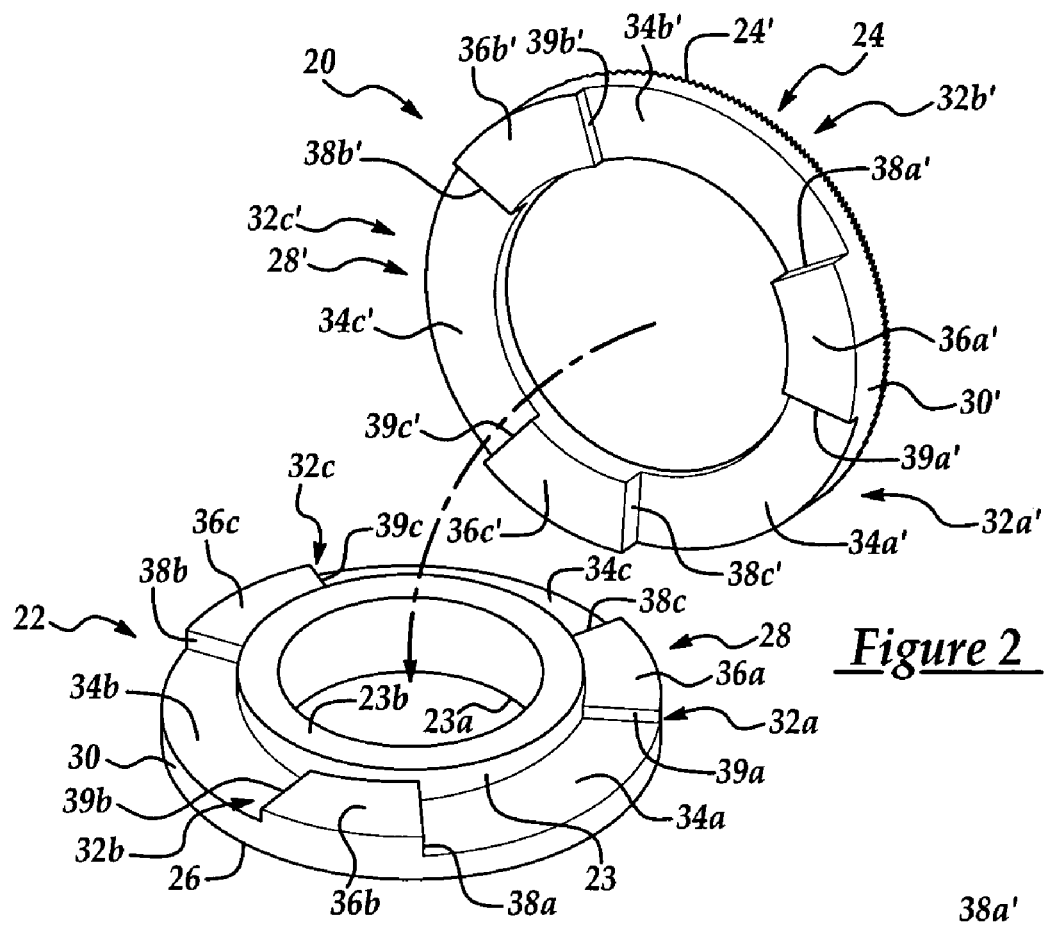
FIG. 2 is an exploded view of the pair of wedge cam washers of FIGS. 1A and 1B.

As shown in FIG. 2, the anti-loosening mechanism 20 comprises, in general, an inner wedge cam washer 22 and an outer wedge cam washer 24 which are adapted to be mounted coaxially with each other on the threaded shank of the bolt 12 between the nut 14 and the work piece A. Inner washer 22 is provided with an annular hub 23 with a central axially extending bore 23a. The bore 23a is sized so as to provide a loose fit with the threaded shank of the bolt 12. The outer diameter of the annular hub 23 is sized so as to provide a loose fit with the bore 25 of the outer washer 24 so that the two washers are maintained in axial alignment when they are mounted on the shank of the bolt 12. The inner washer 22 is provided with a smooth inner axial surface 26 and the cam structure 28 on its outer axial surface adjacent the hub 23, as will be described below.

The cam structure 28 comprises three sets of two-level circumferentially extending wedge cam sets 32a, 32b and 32c formed on a flat base 30. Each of the wedge cam sets 32a, 32b and 32c occupies an angular sector of 120 degrees on the inner washer 22. Wedge cam set 32a comprises a base-cam 34a and a tooth-cam 36a which are separated by a steep shoulder 39a which extends along a radial line of the washer 22. Each of the cam ramps 34a and 36a are comprised of helical surfaces with a constant pitch which is equal to or less than the pitch of the threads of bolt 12, as will be explained below. Wedge cam set 32b comprises a base-cam segment 34b and a tooth-cam segment 36b which are separated by a steep shoulder 39b. Wedge cam set 32b has a configuration identical to that of wedge cam set 32a. Similarly, wedge cam set 32c is identical in configuration to that of wedge cam set 32a and comprises a base-cam segment 34c and a tooth-cam segment 36c which are separated by a steep shoulder 39c. The lower end of the base-cam segment 34a is joined with the higher end of the tooth-cam segment 36b by a steep shoulder 38a. Similarly, the lower end of the base-cam segment 34b is joined to the higher end of the tooth-cam segment 36c by a steep shoulder 38b. Similarly, the lower end of the base-cam segment 34c is joined to the higher end of the tooth-cam segment 36a by a steep shoulder 38c.

Figure 3A:
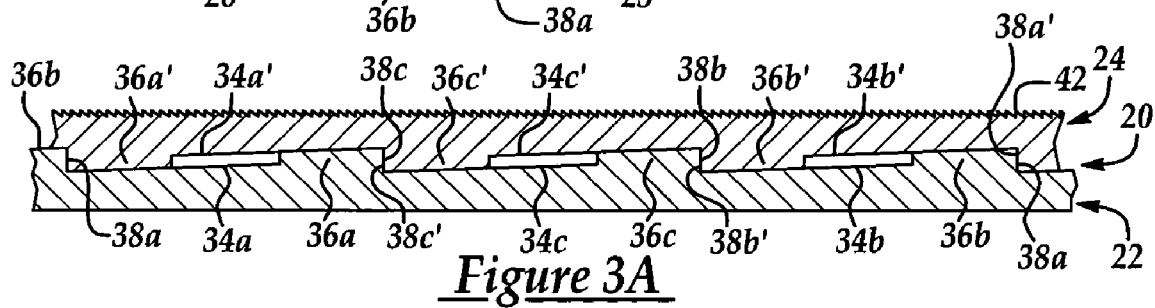
FIGS. 3A, 3B and 3C are developed views showing details of the cam profiles of the pair of wedge cam washers in three successive relative positions.

The outer washer 24 has a cam structure 28' on its inner axial surface with a surface configuration which is a mirror image of the cam structure 28 on inner washer 22. The cam structure 28' comprises three sets of two-level, circumferentially extending wedge cams 32a', 32b' and 32c' formed on a flat base 30'. The outer axial surface of outer washer 24 is provided with a high friction surface 24' for engagement with the nut 14. As shown in FIGS. 2 and 3A, the surface is suitably formed with serrations 42 in sawtooth form so that driving engagement is provided in the loosening of the nut but not in the tightening of the nut. Alternatively, the surface 24' can be provided with a high friction, with or without directional characteristics, by any known means such as a high friction coating or by roughening the surface.

Figure 4:
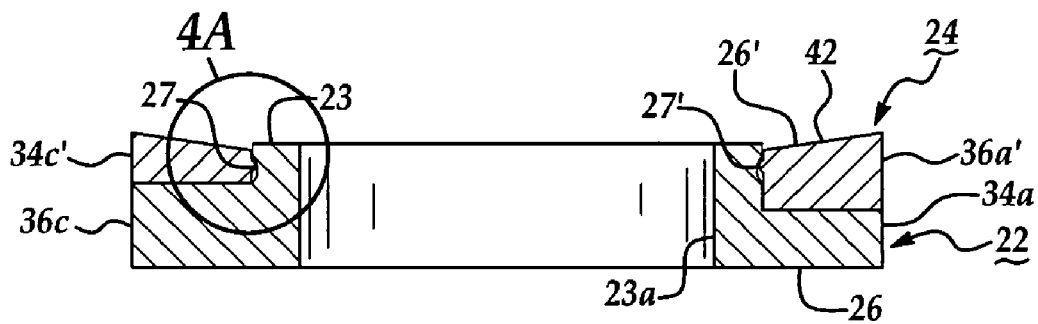
FIG. 4 is a cross-sectional view taken on a section of FIG. 1A in which the wedge cams are formed on a flat base of the washers.
Figure 4A:
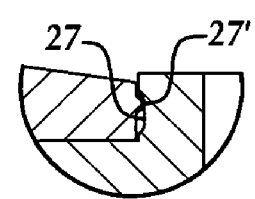
FIG. 4A is an enlarged, fragmentary view of a rib and groove feature used on the washers.

The outer washer 24 is mounted on the inner washer 22 for limited angular rotation about the annular hub 23. Preferably, the outer washer 24 is held in captive relation with the inner washer 22 so that the two washers may be handled as a single unit. For this purpose, an annular groove 27 (FIG. 4) is provided in the external surface of the hub 23 and an annular rib 27' is provided on the inside diameter of the outer washer 24 and is adapted to the mate with the annular groove 27 when the outer washer is disposed around the rib 27 by a forced-fit. As best seen in FIG. 4A, the annular groove 27 is wider in the axial direction than the annular rib 27' so that the outer washer 24 has a limited degree of axial freedom relative to the inner washer 22. The axial freedom permits the stack height of the nested washers to vary with the relative angular position of the wedge cams. The amount of axial movement due to this rib and groove is preferably limited so that the two washers cannot be separated enough to rotate the tooth-cams of one washer past the tooth-cams of the other washer.

It is desirable in some applications to provide a split load design of the inner and outer washers 22 and 24 in order to transmit a portion of the clamping force to the work pieces through both the inner washer 22 and outer washer 24. For this purpose, the outer axial surface 26' of washer 24 can be of conical configuration as shown in FIG. 4. The cone angle of the conical surface 26' is small, for example, about 5 degrees, so that thickness of the outer washer 24 at the outside diameter is slightly greater than that of the inside diameter as will be described below. The nested washers 22 and 24 have a minimum stack height during tightening of the nut and, in this condition, the height of the outer peripheral edge of the washer 24 is slightly higher than that of the hub 23. In this arrangement the nut 14 engages washer 24 at the outside diameter before any engagement with the hub 23 of washer 22 to thereby provide a load splitting arrangement, as will be described further below.

The outer washer 24 is angularly offset in relation to the inner washer 22 so that the tooth-cam segment 36a' is disposed in face to face confrontation with the base-cam segment 34a of the washer 22. In this orientation, the tooth-cam segment 36b' is disposed in face-to-face confrontation with the base-cam segment 34b of washer 22 and the tooth-cam segment 36c' is disposed in face-to-face confrontation with the base-cam segment 34c of washer 22.

Since each base-cam segment on both washers 22 and 24 occupy an angular sector of eighty degrees and each tooth-cam segment on both washers occupy an angular sector of forty degrees, the rotational movement of the outer washer 24 relative to the inner washer 22 is limited in the clockwise direction (tightening direction of the nut 14) by the engagement of the shoulder 38a' with the shoulder 38a simultaneously with the engagement of the shoulder 38b' with the shoulder 38b and the engagement of the shoulder 38c' with the shoulder 38c. The rotation of the outer washer 24 in the counterclockwise direction (loosening direction of the nut 14) is limited by the simultaneous engagement of the shoulder 39a' with the shoulder 39a, the engagement of shoulder 39b' with the shoulder 39b and the engagement of the shoulder 39c' with the shoulder 39c.

Figure 3B:
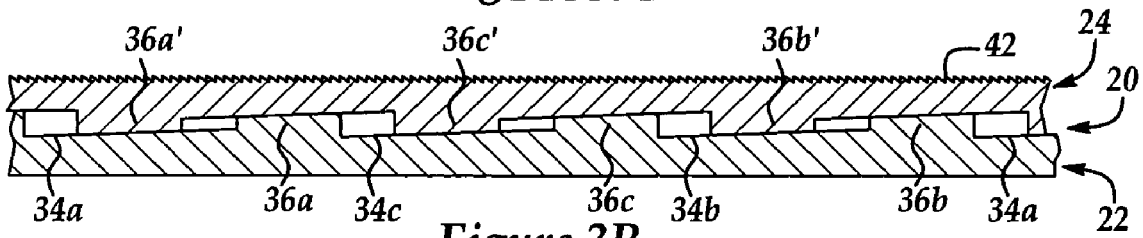
Figure 3C:
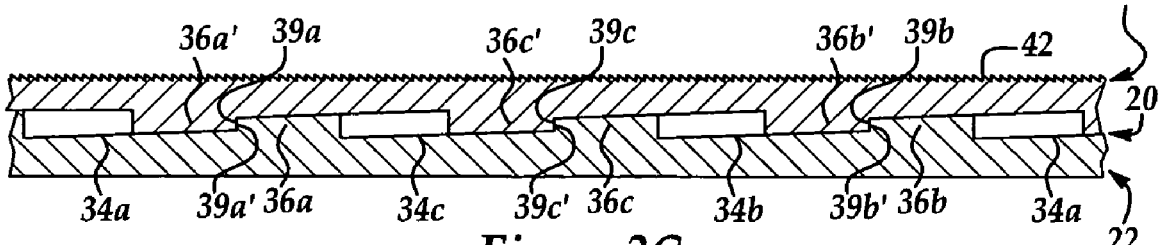

FIGS. 3A, 3B and 3C are developed views of the cam structures 28 and 28' in face-to-face engagement with each other in three different relative angular positions. As shown in FIG. 3A, the outer washer 24 is in a limiting position in the clockwise direction (tightening). In this position, the shoulders 38a', 38b' and 38c' of the tooth-cam ramps 36a', 36b' and 36c' are in engagement with the shoulders 38a, 38b and 38c, respectively of tooth-cam ramps 36b, 36c and 36a.

FIG. 3B shows the outer washer 24 rotated to an intermediate position in which the tooth-cam ramps 36a', 36b' and 36c' are centered on base-cam ramps 34a', 34b' and 34c', respectively.

FIG. 3C shows the outer washer 24 in a limiting position in the counterclockwise direction (loosening). In this position the shoulders 39a', 39b', and 39c' of the tooth-cam ramps 36a', 36b' and 36c' are in engagement with the shoulders 39a, 39b and 39c respectively, of the tooth-cam ramps 36a, 36c and 36b.

As will be appreciated by the views shown in FIGS. 3A–3C, the two washers are able to undergo limited relative rotational movement, with the shoulders 38 of one washer engaging those of the other to limit rotation in one direction and the shoulders 39 engaging each other to limit rotation in the opposite direction. Advantageously, the helical, complementary, mating cam surfaces of the tooth-cams and base-cams, together with the use of the shoulders to limit rotation in each direction, results in a construction of the washers that maintains a substantially constant surface area of contact between each other throughout the extent of the limited relative rotational movement. This helps prevent damage to the cam surface edges of the washers and helps prevent embedment of an edge of one washer into the other.

FIG. 4 is a cross sectional view of inner washer 22 and outer washer 24 in nested relation with each other. This cross section is taken such that it cuts through the tooth-cam segment 36c of washer 22 and the confronting base-cam segment 34c' of washer 24 and also cuts through the tooth-cam segment 36a' of washer 24 and confronting base-cam segment 34a of washer 22. As shown in FIGS. 3A, 3B and 3C, each of the base-cam ramps 34a, 34c and 34b on the inner washer 22 is in face-to-face engagement with the confronting tooth-cam ramps 36a', 36c' and 36b', respectively, throughout the entire range of relative angular positions. Similarly, each of the base-cam ramps 34a', 34c' and 34b' on outer washer 24 is in face-to-face engagement with the confronting tooth-cam ramps 36a, 36c and 36b, respectively, on washer 22 throughout the entire range of relative rotation of the washers.

As mentioned above, a high friction surface 24' is provided on the upper surface of the upper wedge cam washer 24. This may be provided by sawtooth serrations 42 on the surface with directional characteristics so that the higher drive transmitting force is applied in the loosening direction than in the tightening direction. The inner surface 26 of the inner washer 22 is preferably smooth so as to avoid any undesired marring of the surface of the work piece which it engages. Preferably, the wedge cam structures 28 and 28' on the washers 22 and 24, respectively, are provided with a hard surface having a low coefficient of friction. For steel washers, this may be provided by conventional nitriding and a low friction coating.

Operation of the Anti-Loosening Fastener

The operation of the first embodiment of the invention will be described below with respect to: 1) tightening of the nut 14 of the clamped joint 10 to clamp the work pieces, 2) operation of the anti-loosening mechanism 20 to prevent unwanted loosening of the clamped joint as a result of shock, vibration and other extraneous forces and 3) loosening of the nut 14 of the clamped joint by means of a wrench or other tool.

Tightening the Nut

In use of the anti-loosening mechanism 20, the wedge cam washers 22 and 24, in nested relation, are inserted between the nut 14 and the work piece A. The washers may be in any random angular position relative to each other, provided that the cam structures are nested together. The nut 14 is tightened in the usual manner and when it initially engages the outer washer 24 the outer washer will rotate with the nut 14 until the shoulders 38a', 38b', and 38c' engage shoulders 38a, 38b and 38c, respectively. If the washers 24 and 22 were initially positioned relative to each other so that the tooth-cams 36a', 36b' and 36c' were in an intermediate position relative to the base cams 34a, 34b and 34c, respectively as shown in FIG. 3B, the inner washer 22 would remain stationary and the tooth-cams would move down the ramps of the base-cams so that the shoulders of the respective cams come into driving engagement with each other as shown in FIG. 3A. In this condition, with continued tightening of the nut, the wedge cam washers 22 and 24 remain stationary relative to the work piece as the tightening of the nut continues. During tightening of the nut the area of engagement between the wedge cam surfaces remains constant for all positions as shown in FIGS. 3A, 3B and 3C. Thus, the clamping force is transmitted through the washers 22 and 24 to the work piece with uniform distribution so that the wear, deformation and embedment of the cam surfaces are minimized. Accordingly, after final tightening of the nut is reached, the engaging cam surfaces of the outer washer will have a minimum resistance to initial movement relative to the inner washer in the loosening direction. This allows the wedge cams to function optimally in resisting loosening of the threaded fastener, as will be described below.

As mentioned above, the inner and outer wedge cam washers 22 and 24 are referred to herein as split-load washers because the clamping load applied by the threaded fastener to the work pieces is divided into two parts. One part is applied directly to the inner washer 22 and another part is applied to the outer washer 24 and transmitted by it to the inner washer 22. As shown in FIG. 4, the inner washer 22 is provided with a washer extension member or hub 23 and the outer washer 24 is provided with a concave conical outer surface 24'. The cone angle of the surface 26' is suitably about 5 degrees. The thickness of the outer washer 24 at its periphery is such that it is about 0.002 inches above the outer surface of the hub 23 and the inner periphery of the outer washer 24 is about 0.002 inches below the surface of the hub 23. With this arrangement, the clamping load applied by the nut 14 is divided or split so that the initial load in the early stage of tightening is applied only to the outer periphery of the outer washer 24 and is transmitted through the inner washer 22 to the work piece. As the tightening proceeds, suitably after about 1 or 1½ turns of the nut, the nut engages the hub 23 of inner washer 22 so that the load is split between the two washers. When the final tightening of the nut reaches the specified torque most of the load is transmitted directly through the inner washer 22 and a lesser portion is transmitted through the outer washer 24 to the inner washer 22 and then to the work piece. The split-load arrangement reduces the force transmitted through the wedge cam for a given clamp load and reduces the wear of the wedge cams and embedment of one into the other during tightening. Further, the split load arrangement applies forces to the inner washer so that it will remain stationary during tightening.

Loosening of nuts in service most commonly occurs when transverse vibratory loads are applied to threaded fasteners. The split load washer is particularly well suited to resisting transverse vibratory loads because the center section of the split load washer continues to take most of the bolt tension preload while the outer washer takes most of the variable load due to the tipping action caused by the transverse vibration. The relative motion in the fastener, if any, is more apt to take place between the wedge cams of both washers where the cams can move up and down the wedge cams without loosening. The loaded center section then takes little of the variable tipping load while the center section acts like an anchor.

Operation of the Anti-Loosening Mechanism

After the fastener assembly has been tightened to its final tightening torque and placed in a service environment in which it is subjected to shock and vibration forces, the operation of the anti-loosening mechanism 20 is believed to be as follows:

When the work piece A is subjected to vibratory motion such motion is imparted to the inner washer 22 which remains stationary relative to the work piece by reason of high frictional engagement. Since the outer washer 24 is engaged with the nut 14, the vibratory motion of the work piece would be imparted to the nut 14 and would cause or promote loosening of the nut, except for the isolation provided by the washers 22 and 24 of the anti-loosening mechanism 20.

The anti-loosening mechanism 20 is believed to provide the desired isolation of the nut 14 from the work piece A in the following manner. After final tightening of the nut, loosening motion of the nut will be initiated by the loosening torque stored in the bolt. During this loosening motion, the nut and outer washer 24 move together and the wedge cam on the outer washer 24 moves up the wedge cam on the inner washer 22 to some intermediate position. (If the pitch of the wedge cams is less than the pitch of the threads, the threads will loosen but the wedge cams will overcome the tension loss (due to thread loosening) and further tighten the joint, increasing the bolt tension and the bolt stretch in the process.

If the pitch of the wedge cams is equal to the thread pitch, the bolt tension will not change but locked-in, torque-loosening stresses will be relieved.) With the outer washer in the intermediate position, it is free to rotate alternately in the tightening and loosening direction through a limited angular zone or "floating seat". When a torque impulse is generated by a vibratory motion of the work piece the mating cam structures move back and forth with respect to each other in this floating seat but because there is limited motion in both directions, there is no cumulative loosening of the threads.

Purposely Loosening the Nut

The nut 14 may be loosened or removed from the clamped joint 10 in the usual manner using a wrench. When the nut is rotated in the loosening direction, the outer washer 24 may rotate with the nut through as much as forty degrees of lost motion between the washers due to the engagement with the high friction surface 24'. In this rotation, the tooth-cams 36a', 36b' and 36c' of the outer washer 24 move up base cams 34a, 34b and 34c, respectively, of the inner washer 22. This causes the stack-up thickness of the washers to increase. Assuming that the pitch of the wedge cams is less than the pitch of the threads of the nut, the movement of the nut in the loosening direction will cause an increase in the bolt tension. However, continued rotation of the outer washer 24 relative to the inner washer 22 will be arrested by the engagement of the shoulders 39a', 39b', and 39c' of the tooth-cams 36a', 36b' and 36c' of the outer washer with the shoulders 39a, 39b, and 39c of the tooth-cams 36a, 36b and 36c, respectively of the inner washer 22 before the stresses in the cams and the bolt become excessive. With the shoulders of the tooth-cams engaged, continuing rotation of the nut in the loosening direction causes the inner washer 22 to rotate with the outer washer 24 and, accordingly, the nut rotation in the loosening direction can be continued without damage to the cam surfaces or to the nut and bolt. If the anti-loosening mechanism 20 is provided with wedge cams having a pitch that is the same as the pitch of the threads of the nut and bolt, the loosening or removal of the nut is accomplished in the same manner as just described; however, the loosening will proceed without any increase in bolt tension.

CONICAL WASHER MODIFICATION

Figure 5:
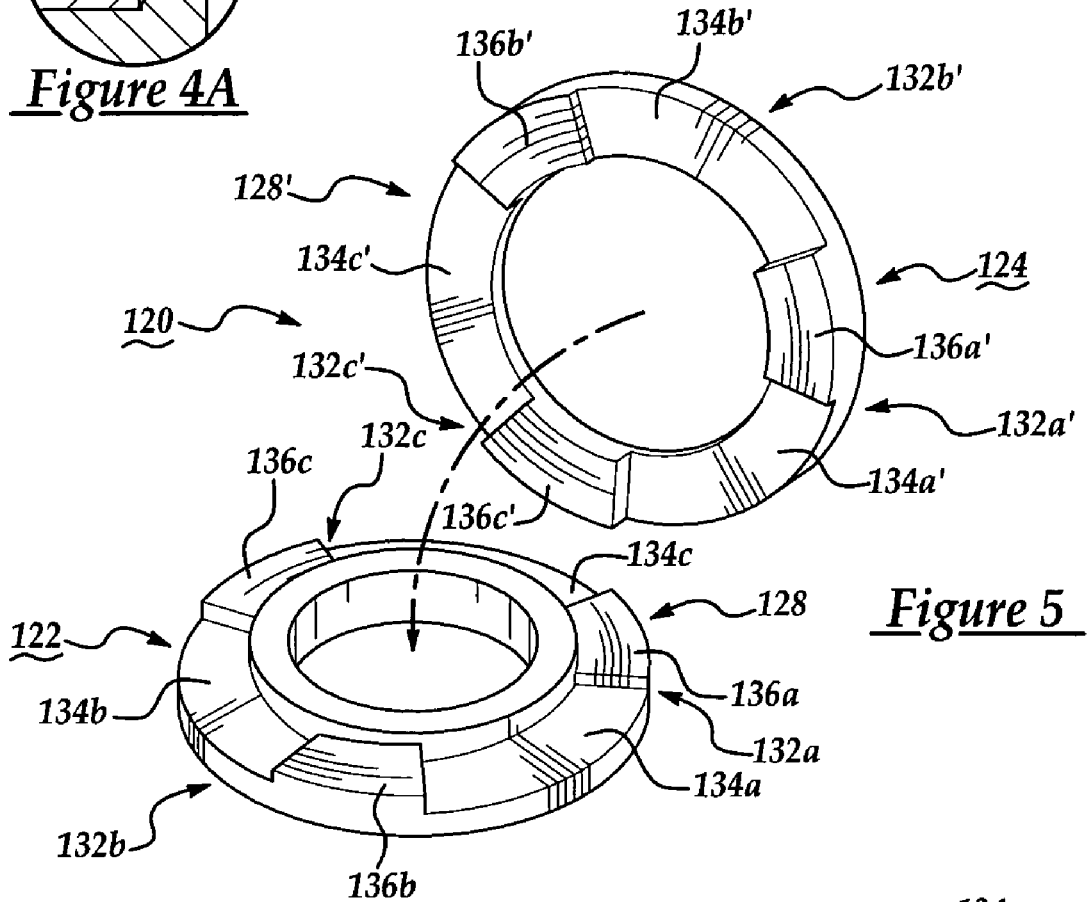
FIG. 5 is an exploded view of a modification of the pair of wedge cam washers of this invention.

FIG. 5 shows a modification of the invention using conical washers. In this modification, the wedge cam sets 132a, 132b and 132c on the inner washer 122 are formed on a convex conical base. Similarly, the mating wedge cam sets 132a', 132b' and 132c' on outer washer 124 are formed on a concave conical base. The cone angles of the wedge cams on the washer 124 are the same as the cone angles of the wedge cams on the inner washer 122; suitably, the cone angles are equal to 10°.

In use of the anti-loosening mechanism 120, the nut 14 is tightened as described above. As the tension increases in the bolt 12, the conical surfaces of the wedge cams cause the outer washer 124 to be pushed outwardly into hoop tension as the bolt tension increases. When the fastener assembly is subjected to vibration and shock, the hoop tension in the outer washer causes motion to take place between the cam surfaces of the wedge cam. The motion between the cams enables the torque stored in the system during tightening to move the cams of outer washer 24 up the ramps of inner washer 22 which increases the bolt tension until torque equilibrium is reached. This action enhances the anti-loosening operation of mechanism as described above.

Figure 6:
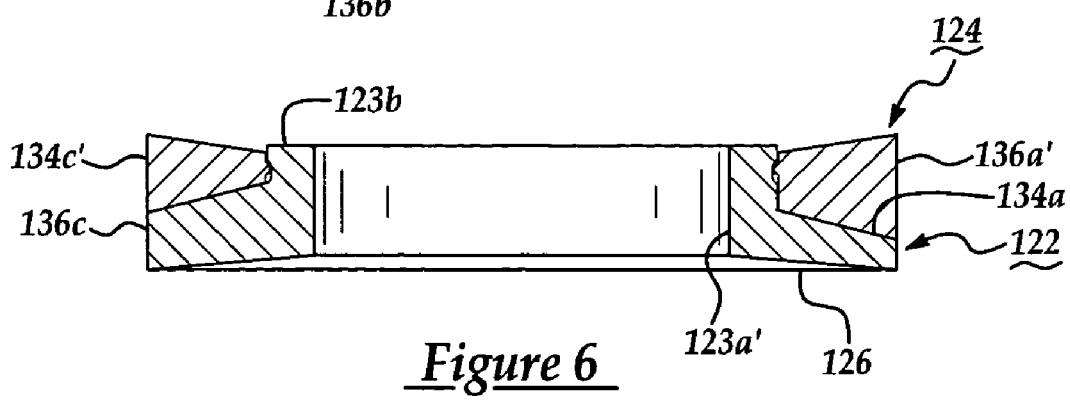
FIG. 6 is a cross-sectional view of the pair of wedge cam washers of FIG. 5 in which the wedge cams are formed on a conical base of the washers.

As shown in FIG. 6, the inner washer 122 can also comprise a concave conical inner surface 126. In the illustrative embodiment, this cone angle is approximately 5°. The conical inner surface 126 of the inner washer 22 is effective to increase the uniformity of load distribution over the area of washer surface 126. This provides greater resistance to loosening torque.

NUMBER OF WEDGE CAM SETS

Figure 7:
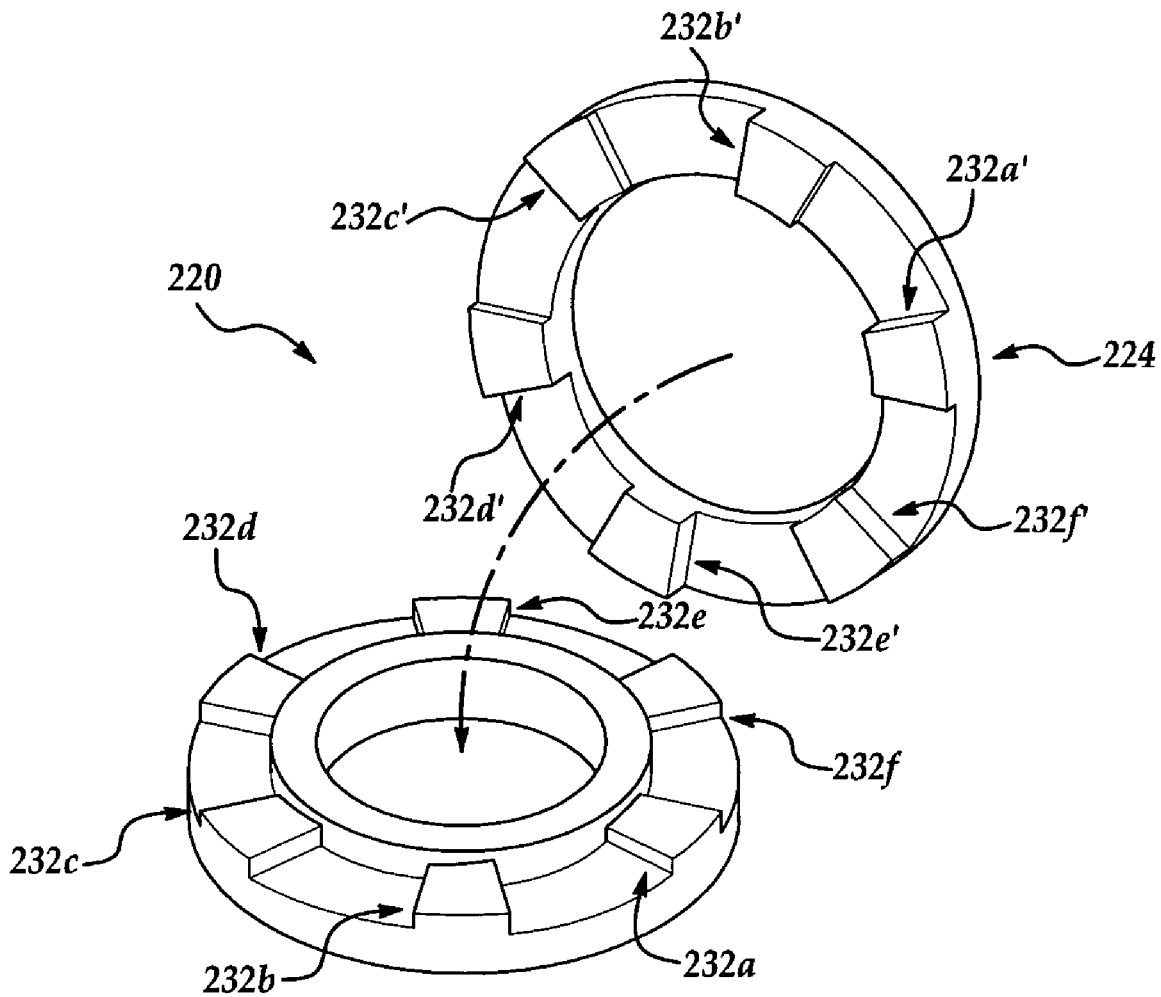
FIG. 7 is an exploded view of a pair of wedge cam washers of another modification of the invention.

FIG. 7 shows another modification of the invention. This modification has an anti-loosening mechanism 220 with a set of six wedge cams on each washer. In this modification, each of the wedge cam sets 232a–232f occupies an angular sector of 60° on the inner washer and each of the wedge cam sets 232a'–232f' occupies an angular sector of 60° on the outer washer 224. Each tooth-cam occupies an angular sector of 20° and each base-cam occupies a sector of 40° which affords 20° of travel between the cams. Otherwise, the inner and outer washers 222 and 224 of this modification are the same as the inner and outer washers 22 and 24 of FIG. 2.

It will be understood that the wedge cam washers of this invention can be designed with various numbers of wedge cam sets. For example, the number of cam sets could be 2, 3, 4, 5, 6, 8, 10, or 12 which would permit rotation of the tooth-cams on the outer washer between the shoulders of the base cams on the inner washer (and vise versa) through a lost-motion of 60°, 40°, 30°, 24°, 20°, 15°, 12° or 10°, respectively. In all of such examples a nominal two-thirds of the total cam surface area is loaded in all relative positions of the wedge cams, and all assume that all cam tooth widths are the same and equal to the free angular motion between cam teeth in degrees.

Spring Loaded Wedge Cam Washers

Figure 8:
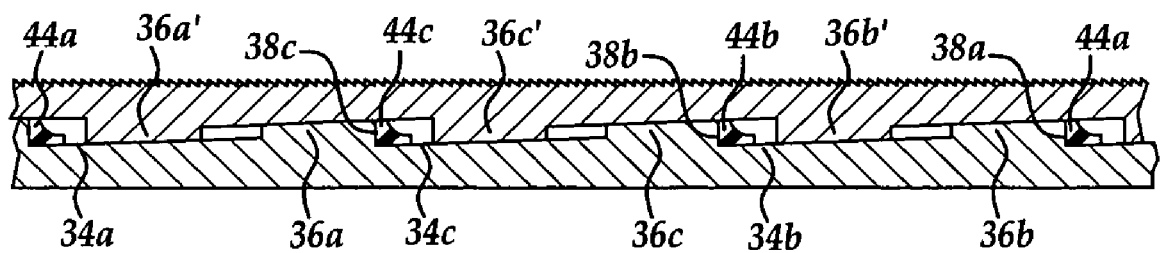
FIG. 8 is a developed view of the cam profiles of the wedge cam washers of another modification of the invention.

FIG. 8 shows a modification of the invention in which the wedge cams are spring loaded to enhance the anti-loosening characteristics of the anti-loosening mechanism 420 and to provide other benefits. This modification is shown in FIG. 8 which is analogous to FIG. 3B of the first embodiment. This modification differs from FIG. 3B in that a set of torsion springs is operatively interposed between the outer washer 24 and the inner washer 22 which act as compression springs and absorb energy during tightening of the nut and which release the stored energy when the applied torque is released to enhance the operation of the anti-loosening mechanism. As shown in FIG. 8, a set of springs comprises rubber bumpers 44a, 44b and 44c which are secured at the lower ends of the base-cam ramps 34a, 34b and 34c, respectively; in particular rubber bumper 44a is secured in the corner formed by the base cam-ramp 34a and the shoulder 38a of tooth-cam 36b. Rubber bumper 44b is secured in the corner formed by the base cam segment 34b and the shoulder 38b of the tooth-cam 36c. Rubber bumper 44c is secured in the corner formed by the base cam ramp 34c and the shoulder 38c of tooth-cam 36a. The rubber bumpers are suitably secured in place by suitable means to the adjoining surfaces of the wedge cam sets.

The rubber bumpers 44a, 44b and 44c operate in the following manner. During tightening of the nut 12, the shoulder 38b' of tooth-cam 36b' moves down the base-cam ramp 34b and engages the free end of the rubber bumper 44b and compresses the bumper progressively with continued tightening of the nut. Similarly, rubber bumpers 44a and 44c are compressed simultaneously and energy is stored in rubber bumpers. Upon final tightening and removal of the applied torque, each of the rubber bumpers releases its stored energy and applies a torque in a loosening direction to the outer washer 24 causing it to move up the wedge cam ramps of washer 22 to an intermediate position on the ramps, thereby increasing the bolt tension. With the wedge cam washers 22 and 24 in this relative position, they are adapted to absorb shock and vibration forces by back and forth motion between limiting positions without imparting any cumulative loosening motion to the nut, as described above.

Although this invention has been described with reference to a particular embodiment, it is not to be construed in a limiting sense. Many variations and modifications of the invention will now occur to those skilled in the art. For example, the annular washers need not be circular in shape, but instead could have a hexagonal or other polygonal shape extending around their central bore. Alternatively, one of the washers can be eliminated by incorporating the wedge cam sets of that washer into one or both of the threaded fastener components Thus, for example, the cam surfaces can be disposed on the inner face of a nut and the outer face of a washer, the inner face of a bolt head and the outer face of a washer or, as shown in the various illustrated embodiments, on the confronting faces of two washers.

The invention claimed is:

1. A locking device for use with a threaded fastener, the fastener comprising first and second fastener elements having female and male threads, respectively, for mating engagement with each other, said locking device comprising:
   first and second washers, each having an annular main body portion with a plurality of wedge cam sets, said wedge cam sets each including a base-cam and a raised tooth-cam adjacent said base-cam, said base-cam and said tooth-cam of each wedge cam set being separated by a first axial shoulder of said tooth-cam, and said wedge cam sets each being separated from an adjacent wedge cam set by a second axial shoulder of said tooth-cam;
   wherein said base-cams each have a ramped cam surface and have a greater angular extent than said tooth-cams such that, when said washers are assembled together with said wedge cam sets of said washers being placed in confronting relationship, said tooth-cams of each washer contact a base-cam surface of the other washer, thereby permitting limited relative rotational and axial movement of said washers in which said tooth-cams slide along said ramped base-cams for a predetermined angular distance limited in one rotational direction by mutual engagement of said first shoulders and limited in the opposite rotational direction by mutual engagement of said second shoulders.

2. A locking device as defined in claim 1, wherein said base-cams and said tooth-cams each comprise arcuate sectors of said washers.

3. A locking device as defined in claim 1, wherein said washers each have an annular base with said wedge cam sets being located on one axial side of said base.

4. A locking device as defined in claim 1, wherein, for each of said washers, said base-cams and said tooth-cams of each wedge cam set have substantially the same dimensions as the base-cams and tooth-cams of the other wedge cam set(s).

5. A locking device as defined in claim 4, wherein said tooth-cams each have a ramped cam surface and wherein said ramped cam surfaces of said base-cams and tooth-cams of said first and second washers are helical segments, all having substantially the same pitch.

6. A locking device as defined in claim 1, wherein said ramped surfaces are inclined such that relative movement between said washers in a tightening direction causes each tooth-cam to move slidably down its associated base-cam surface to decrease the combined axial height of the washers, and relative movement between said washers in a loosening direction causes each tooth-cam to move slidably up its associated base-cam surface to increase said combined axial height.

7. A locking device as defined in claim 6, wherein said washers are capable of relative rotational movement through a predetermined angle which, in each rotational direction is limited by engagement of said tooth-cams from said first washer with said tooth-cams of said second washer.

8. A locking device as defined in claim 7, wherein said base-cam surfaces are inclined such that the change in combined axial height of the washers during relative rotation of said washers through a given angle less than said predetermined angle is greater than the change in axial separation of the first and second fastener elements when they are rotated relative to each other in the same direction for the same given angle.

9. A locking device as defined in claim 6, further comprising at least one spring disposed axially between said two opposing base-cams of said washers, said one or more springs biasing said washers in said loosening direction.

10. A locking device as defined in claim 1, wherein said plurality of wedge cam sets on each washer comprises 2, 3, 4, 5, 6, 8, 10, or 12 wedge cam sets.

11. A locking device as defined in claim 10, wherein each washer includes three wedge cam sets each extending about 120° around its associated washer.

12. A locking device as defined in claim 11, wherein each base-cam extends about 80° and each tooth-cam extends about 40°.

13. A locking device as defined in claim 1, wherein at least one of said washers is treated such that the frictional engagement of said tooth-cams with said base-cams is less than the frictional engagement of said washers with either the fastener or a workpiece, or both.

14. A locking device as defined in claim 1, wherein one or both of said washers has a conical axial side located opposite said wedge cam sets.

15. A locking device as defined in claim 1, wherein the contacting surfaces of said base-cams and said tooth-cams are radially inclined.

16. A locking device for use with a threaded fastener, the fastener comprising first and second fastener elements having female and male threads, respectively, for mating engagement with each other, said locking device comprising:
   first and second washers, each having an annular main body portion and being disposed in face-to-face relationship with confronting generally parallel wedge cam sets, said wedge cam sets each including a base-cam ramp surface and an axially extending tooth-cam, with each said tooth-cam contacting a base-cam of the other washer, said ramp surfaces being respectively inclined relative to the axis of the washers such that relative movement between said washers in a tightening direction causes each tooth-cam to move slidably down its associated base-cam ramp surface to decrease the combined axial height of the washers, and relative movement between said washers in a loosening direction causes each tooth-cam to move slidably up its associated base-cam ramp surface to increase said combined axial height;
   wherein each tooth-cam of each washer has a limited range of travel along its associated base-cam of the other washer and wherein each tooth-cam maintains a constant surface area of contact with its associated base cam throughout said range of travel.

17. A locking device as defined in claim 16, wherein each washer includes three wedge cam sets each extending about 120° around its associated washer.

18. A locking device as defined in claim 17, wherein each base-cam extends about 80° and each tooth-cam extends about 40°.

19. A locking device for use with a threaded fastener, the fastener comprising first and second fastener elements having female and male threads, respectively, for mating engagement with each other, said locking device comprising:
   first and second washers, each having an annular main body portion and being disposed in face-to-face relationship with confronting generally parallel wedge cam sets, said wedge cam sets each including a base-cam ramp surface and an axially extending tooth-cam, with each said tooth-cam contacting a base-cam of the other washer, said ramp surfaces being respectively inclined relative to the axis of the washers such that relative movement between said washers in a tightening direction causes each tooth-cam to move slidably down its associated base-cam ramp surface to decrease the combined axial height of the washers, and relative movement between said washers in a loosening direction causes each tooth-cam to move slidably up its associated base-cam ramp surface to increase said combined axial height;
   wherein said washers are capable of relative rotational movement through a predetermined angle which, in each rotational direction is limited by engagement of said tooth-cams from said first washer with said tooth-cams of said second washer.

20. A locking device as defined in claim 19, wherein said base-cam ramp surfaces are inclined such that the change in combined axial height of the washers during relative rotation of said washers through a given angle less than said predetermined angle is greater than the change in axial separation of the first and second fastener elements when they are rotated relative to each other in the same direction for the same given angle.

21. A locking device as defined in claim 19, wherein, for each of said washers, said base-cams and said tooth-cams of each wedge cam set have substantially the same dimensions as the base-cams and tooth-cams of the other wedge cam set(s).

22. A locking device as defined in claim 21, wherein said tooth-cams each have a ramped cam surface and wherein said ramped surfaces of said base-cams and tooth-cams of said first and second washers are helical segments, all having substantially the same pitch.

23. A locking device as defined in claim 19, further comprising at least one spring disposed axially between said two opposing base-cams of said washers, said one or more springs biasing said washers in said loosening direction.

24. A locking device as defined in claim 19, wherein said plurality of wedge cam sets on each washer comprises 2, 3, 4, 5, 6, 8, 10, or 12 wedge cam sets.

25. A locking device as defined in claim 19, wherein at least one of said washers is treated such that the frictional engagement of said tooth-cams with said base-cams is less than the frictional engagement of said washers with either the fastener or a workpiece, or both.

26. A locking device as defined in claim 19, wherein one or both of said washers has a conical axial side located opposite said wedge cam sets.

27. A locking device as defined in claim 19, wherein the contacting surfaces of said base-cams and said tooth-cams are radially inclined such that the thickness of the base-cams and tooth-cams vary in a radial direction.

28. A locking device for use with a threaded fastener, the fastener comprising first and second fastener elements having female and male threads, respectively, for mating engagement with each other, said locking device comprising:

first and second washers, each washer having first and second axial surfaces with said first surface having a number of angularly-extending recessed cam surfaces bounded at a first angular end by a first raised shoulder and bounded at a second angular end by a second raised shoulder, wherein each said cam surface is inclined and wherein, for each cam surface, the height of said first raised shoulder above said cam surface at said first end is greater than the height of said second raised shoulder above said cam surface at said second end.

29. A locking device as defined in claim 28, wherein said first raised shoulder comprises an edge of a first axial protrusion, and said second raised should comprises an edge of a second axial protrusion.

30. A locking device as defined in claim 29, wherein said axial protrusions each comprise a raised cam-tooth extending angularly between a pair of raised shoulders.

31. A locking device as defined in claim 29, wherein each washer has a plurality of said recessed cam surfaces and a plurality of said axial protrusions, with each recessed cam surface separated from at least one adjacent recessed cam surface by a pair of said axial protrusions.

32. A locking device as defined in claim 31, wherein, said recessed cam surfaces each extend about said washer for a first angular distance and said axial protrusions each extend about said washer for a second angular distance that is less than said first angular distance, and wherein said first axial surfaces of said washers can be brought into engagement with said axial protrusions of each washer contacting the recessed cam surfaces of the other washer, with the washers being capable of relative rotational movement through a predetermined angle which, in one rotational direction is limited by engagement of said first raised shoulders of said first washer with said first raised shoulders of said second washer and, in the other rotational direction is limited by engagement of said second raised shoulders of said first washer with said second raised shoulders of said second washer.

33. A locking device as defined in claim 32, wherein said recessed cam surfaces are inclined such that the change in combined axial height of the washers during relative rotation of said washers through a given angle less than said predetermined angle is greater than the change in axial separation of the first and second fastener elements when they are rotated relative to each other in the same direction for the same given angle.

34. A locking device as defined in claim 28, wherein one or both of said second axial surfaces have a high friction surface treatment.

35. A locking device for use with a threaded fastener, the fastener comprising first and second fastener elements having female and male threads, respectively, for matins engagement with each other, said locking device comprising:

first and second washers each having a central axis, said first washer having an annular base and a central hub extending axially from one side of said base, said washers both including a set of cam surfaces with said second washer including a central bore having a diameter that is greater than an outer diameter of said hub, said cam surfaces of said first washer being located on said one side of said base axially recessed relative to said hub and radially spaced outwardly of said hub, wherein said cam surfaces of said washers can be brought into confronting relationship with said second washer being mounted on said hub such that said central axes are aligned;

wherein said second washer has an inner bore, and wherein one of said hub and said inner bore has a groove and the other of said hub and said inner bore has a rib extending into said groove to secure said washers together while permitting relative rotational movement of said washers.

36. A locking device as defined in claim 35, wherein said first and second washers each have a plurality of wedge cam sets, said wedge cam sets each including a base-cam and an axially extending tooth-cam, with each said tooth-cam contacting a base-cam of the other washer, said base-cams comprising said cam surfaces with said cam surfaces being inclined relative to said central axis such that relative movement between said washers in a tightening direction causes each tooth-cam to move slidably down its associated cam surface to decrease the combined axial height of the washers, and relative movement between said washers in a loosening direction causes each tooth-cam to move slidably up its associated cam surface to increase said combined axial height.

37. A locking device as defined in claim 36, wherein said first and second washers are capable of limited relative rotational movement due to interfering engagement of said tooth-cams of said first washer with said tooth-cams of said second washer, and wherein, when said washers are at one of their limits of relative rotational movement which results in said combined axial height being at a minimum, said hub is axially recessed slightly relative to said second washer at its outer periphery.

38. A locking device as defined in claim 36, wherein said second washer has a surface treatment on an outer axial surface that provides greater friction in the loosening direction than in the tightening direction.

39. A locking device as defined in claim 35, wherein said groove is wider than said rib such that said washers can undergo limited axial movement relative to each other.

40. A locking device for use with a threaded fastener, the fastener comprising first and second fastener elements having female and male threads, respectively, for mating engagement with each other, said locking device comprising:

first and second washers, each washer having first and second axial surfaces with said first surface having a number of angularly-extending cam surfaces, wherein said cam surfaces of each washer include recessed cam surfaces and raised cam surfaces;

wherein, when said washers are assembled together with said first axial surfaces being placed in confronting relationship, at least some of said raised cam surfaces of each washer engage an associated one of said recessed cam surfaces of the other washer while permitting limited relative rotational movement of said washers; and wherein said washers maintain a constant surface area of contact between each other throughout the extent of said limited relative rotational movement.

41. A locking device as defined in claim 40, wherein at least some of said engaged cam surfaces are inclined such that the combined axial height of said washers changes during said relative rotational movement.

42. A locking device as defined in claim 40, wherein said cam surfaces of each washer comprise pairs of angularly-extending cam surfaces, each pair including one of said recessed cam surfaces and one of said raised cam surfaces, with each recessed cam surface be bounded at each end by a raised cam surface, and each raised cam surface being bounded at each end by a recessed cam surface, and wherein when said washers are assembled together with said first axial surfaces being placed in confronting relationship, said raised cam surfaces of each washer contact a portion of a recessed cam surface of the other washer.

43. A locking device as defined in claim 42, wherein each said raised cam surface can contact different portions of its associated recessed cam surface when said washers are oriented at different relative rotational positions, and wherein said recessed and raised cam surfaces each have complementary, mating conformations such that, for each raised cam surface, substantially all of said raised cam surface is in contact with its associated recessed cam surface at each of said different relative rotational positions.

44. A locking threaded fastener, comprising:
first and second threaded components, one of said threaded components having female threads and the other of said threaded components having a shank with male threads that mate with said female threads;
a washer having an annular main body portion with a central bore sized to receive said shank, said washer and said first threaded component each having a plurality of wedge cam sets, said wedge cam sets each including a base-cam and a raised tooth-cam adjacent said base-cam, said base-cam and said tooth-cam of each wedge cam set being separated by a first axial shoulder of said tooth-cam, and said wedge cam sets each being separated from an adjacent wedge cam set by a second axial shoulder of said tooth-cam;
wherein said base-cams each have a ramped cam surface and have a greater angular extent than said tooth-cams such that, when said threaded components and washer are assembled together via said shank with said wedge cam sets of said washer being placed in confronting relationship with said wedge cam sets of said first threaded component, said tooth-cams of said washer contact a base-cam surface of said first threaded component, thereby permitting limited relative rotational and axial movement of said washer and first threaded component in which said tooth-cams slide along said ramped base-cams for a predetermined angular distance limited in one rotational direction by mutual engagement of said first shoulders and limited in the opposite rotational direction by mutual engagement of said second shoulders.

* * * * *